United States Patent

[11] 3,584,186

[72] Inventors James B. Stearns
Elm Grove;
Robert W. Wendelburg, Milwaukee, both of, Wis.
[21] Appl. No. 819,334
[22] Filed Apr. 25, 1969
[45] Patented June 8, 1971
[73] Assignee Chemetron Corporation
Chicago, Ill.

[54] DIRECT CURRENT POWER SUPPLY WITH ADJUSTABLE INDUCTANCE CONTROL
3 Claims, 2 Drawing Figs.

[52] U.S. Cl. .................................................. 219/131WR,
219/132, 323/89A
[51] Int. Cl. ............................................. B23k 9/10
[50] Field of Search ........................................... 219/131,
135; 315/284; 323/89 A, 89 C, 22 SCR

[56] References Cited
UNITED STATES PATENTS
| | | | |
|---|---|---|---|
| 3,237,051 | 2/1966 | Schober | 219/135 |
| 2,658,132 | 11/1953 | Welch | 323/89X |
| 3,345,552 | 10/1967 | Aldenhoff | 219/131R |
| 3,346,799 | 10/1967 | Aldenhoff | 219/131R |
| 3,371,242 | 2/1968 | Aldenhoff et al. | 315/139 |
| 3,432,739 | 5/1969 | Kauffman | 323/89 |
| 3,497,769 | 2/1970 | Stearns | 219/131 |

OTHER REFERENCES
G. E. Transistor Manual 7th Edition Figure 13.40 pages 329 (attached)

Primary Examiner—J. V. Truhe
Assistant Examiner—George A. Montanye
Attorney—James E. Nilles

ABSTRACT: An arc welding supply having a three phase transformer and full wave rectifier including controlled rectifiers. A saturable inductor unit includes a series load winding in series with the supply to carry arc current and wound on the center leg of a three-legged core. Direct current control windings are wound on the outer legs and connected in series to a DC source to vary the inductance of the load winding between 100 and 600 microhenries. The DC source includes a center tapped transformer and controlled rectifiers with the control windings connected between the center tap and the rectifiers. A unijunction transistor oscillator controls the rectifiers and includes a low wattage potentiometer to control the firing rate.

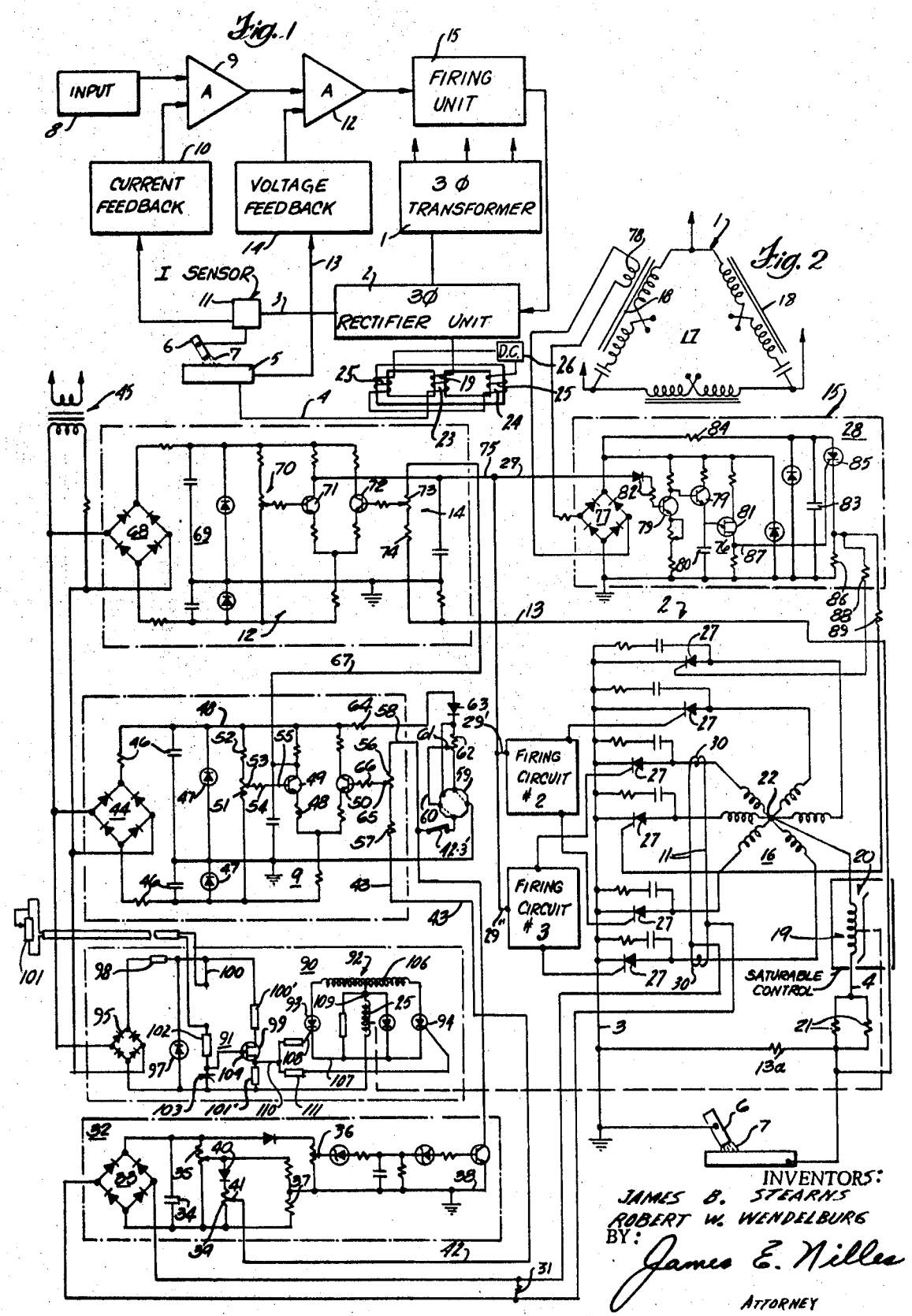

3,584,186

DIRECT CURRENT POWER SUPPLY WITH ADJUSTABLE INDUCTANCE CONTROL

BACKGROUND OF THE INVENTION

This invention relates to an arc supply having an adjustable series load inductance unit and particularly, a saturable inductor unit.

Direct current power supplies for establishing and maintaining an arc such as a welding arc between a pair of electrodes may be of a motor-generator or a transformer-rectifier construction. Transformer-rectifier units have recently been developed employing triggered solid-state elements such as a silicon controlled rectifier. An unusually satisfactory arc welding power supply of this character is disclosed in U.S. Pat. No. 3,337,769 to J. Buchanan and more particularly in applicants' copending application entitled, "Direct Current Arc Power Supply with Stabilized Feedback Control," which was filed on the same day as this application and is assigned to the same assignee, and more fully disclosed in the above application.

As noted in the Buchanan U.S. Pat. No. 3,337,769, the controlled rectifiers create a pulsating-type arc voltage which have normally required a smoothing inductance in the load leads to reduce the ripple effect. The smoothing inductance is advantageously a saturable reactor or inductor in which a DC saturating control winding determines the inductance of a series connected load winding. The control winding may be connected through a variable resistor and full wave rectifier to the welding transformer to provide a direct current saturating power. Additionally, sustaining diodes to low voltage taps on the secondaries and in parallel with the controlled rectifiers are suggested to supply a background voltage and thereby reduce the ripple voltage at low voltages and currents such as employed in short arc and spray transfer welding.

Although the prior art devices provide highly satisfactory welding sources, the sustaining diodes and associated tapped transformer are relatively expensive. The variable resistor in the inductance was also found by applicants to constitute a substantial heat source which adversely affected associated control components when incorporated in a remote voltage and current control unit.

SUMMARY OF THE INVENTION

The present invention is particularly directed to an arc welding supply having an improved saturable inductor control means which eliminates the necessity of auxiliary sustaining diodes and the like and which is particularly adapted to remote control of the inductor control means. Generally, in accordance with the present invention, the saturable inductor means has the direct current saturating control windings connected to a full wave rectifier employing triggered rectifier means or the like. A pulse forming network controls the firing of the rectifier means and thereby the level of direct current in the saturating control winding. The pulse forming network includes a small, low wattage potentiometer for controlling the phase or time of the firing pulse relating to the voltage applied to the controlled rectifiers and thereby the saturating current level. The potentiometer generates a minimal amount of heat and thus particularly adapts the control to a remote control system. Additionally, the saturable inductor is constructed to insert a substantially greater inductance in the load circuit at low arc current and voltage. Thus, the inductor may be set to insert an inductance on the order of 600 microhenries which has been found to establish a smooth arc at the low current and voltage range without the necessity of sustaining diodes or other auxiliary equipment.

In a particularly novel aspect of the present invention, the saturating control winding is connected to a single-phase full wave center tapped transformer-controlled rectifier unit. The controlled rectifiers of the unit are fired from a unijunction transistor oscillator having the potentiometer connected in the input circuit to control the phase or time of the pulse signals relative to the positive voltages applied to the controlled rectifiers and thereby the on-time of the controlled rectifiers. The potentiometer forms a part of a resistor-capacitor timing input for the oscillator and thereby the time that the output pulse is created. This provides a reliable saturating control circuit for establishing the desired range of inductance control and particularly, permits convenient remote control of the firing pulse. Further, the potentiometer adjusted controlled rectifier supply also provides a substantially linear control of the inductance.

BRIEF DESCRIPTION OF THE DRAWINGS

FIG. 1 is a block diagram of the power supply and control circuitry for an arc welding system having a saturable inductor control in accordance with the present invention; and FIG. 2 is a schematic circuit diagram illustrating the preferred construction of the present invention shown in FIG. 1.

DESCRIPTION OF THE PREFERRED EMBODIMENT

Referring to the drawing and particularly to FIG. 1, the illustrated embodiment of the invention includes a polyphase welding transformer 1 providing an alternating current input to a full wave polyphase rectifier unit 2. A pair of output leads 3 and 4 are connected to the rectifier with the lead 3 shown as a positive lead and the lead 4 shown as a negative lead. In the illustrated embodiment of the invention, the negative lead is connected to a work member 5 and the positive lead 3 is connected to an electrode 6. When the power supply is energized, an arc 7 is established and maintained between the electrode 6 and the work member 5. For proper arc welding, the voltage across the electrode and the work member 5 is preset and maintained at an essentially constant arc voltage. A reference voltage input 8 is connected to one side of a current feedback summing amplifier 9. The second input of the amplifier 9 is connected via a current feedback unit 10 to a current sensing unit 11 connected to establish a signal proportional to the current through load line 3. The output of the summing amplifier 9 is connected as a first input to a voltage feedback summing amplifier 12. The second input of the amplifier 12 is connected to voltage signal leads 13 connected across the leads 3 and 4, and particularly a load resistor 13a via a voltage feedback network 14. The output of the amplifier 12 is therefore, a modified voltage signal related to the slope characteristic established by the current feedback and in turn modified by the desired constant voltage characteristics. The output of the amplifier 12 is connected to a firing unit 15 which is adapted and interconnected to the rectifier unit 2 to produce properly timed spaced firing pulses to the bank of triggered rectifiers, which are subsequently described, for proper phasing of the rectifier network to establish and maintain the desired voltage across the electrodes 6 in the work 5 and therefore across arc 7.

A preferred construction of one embodiment of the circuitry is shown in FIG. 2.

Referring particularly to FIG. 2, the transformer 1 is illustrated as a three phase transformer having a six phase star secondary 16 and coupled to a three phase delta-connected primary 17. The windings of the primary and secondary are suitably coupled on a common core 18 to establish a constant potential transformer for establishing a similar output at leads 3 and 4.

The common or star point of the secondary 16 is connected in series with a saturating load winding 19 of a saturable reactor or inductor control circuit 20 and a pair of paralleled slope control resistors 21 to the work 5. The saturable reactor control unit 20 provides an adjustable inductance in series with the welding arc 7, particularly for short arc welding characteristics.

The saturable inductor control unit 20 includes the series load winding 19 connected between the secondary winding common connection 22 and the nichrome resistors 21. The load winding 19 is wound on the center leg 23 of a three leg core 24, as diagrammatically shown in FIG. 1. A pair of DC windings 25 are wound respectively on the outer legs of the core 24 and connected in series with each other to a DC power supply 26 which is constructed in accordance with the present invention, as shown in preferred construction in FIG. 2, and more fully described hereinafter. Generally, in accordance with the present invention, saturable inductor control unit 20 is constructed to permit varying of the inductance from approximately 100 microhenries to 600 microhenries. Applicants have found that with this construction, the proper inductance may be inserted into the circuit for short arc welding to maintain a stable arc without the necessity of the sustaining diodes employed in the prior art. This correspondingly results in a simplification in the construction of the main transformer and a consequent reduction in the process and the cost.

As shown in applicants' previously identified application, the outer end of each phase winding of the secondary 16 is similarly connected to the lead 3 in series with a silicon controlled rectifier 27. The diametrically opposite phase windings of the star connected secondary are connected by simultaneously conducting controlled rectifiers and the rectifiers 27 are connected in pairs to the line 3 to carry the corresponding phase currents. The portion of the positive half-wave of each secondary winding 16 applied across the leads 3 and 4 is controlled by the phased firing of the related control rectifiers 27.

The paired rectifiers 27 are connected to corresponding similar firing circuits 28 of which one is shown in detail. The other firing circuits for the other paired rectifiers 27 are similarly constructed and consequently are shown in appropriately labeled blocks. The firing circuit 28 is energized via an input signal line 29 connected to the output of amplifier 12 as shown in FIG. 1. The signal at line 29 determines the particular time in each half cycle of the related phase voltage applied to rectifiers 21 at which a firing pulse is applied to the rectifiers 27 and thereby determines the particular time in the phase that the related rectifier 27 conducts the output of the related secondary.

In FIG. 2, the current sensing unit 11 includes a pair of sensing windings 30 coupled to the leads from the phase winding to the anodes of a pair of rectifiers 27. The windings are connected in parallel with the output leads 31 connected to the current feedback network 10. The current feedback network 10 includes a separate slope circuit 32, the output of which is interconnected into the summing amplifier 9.

The illustrated slope circuit 32 includes a full wave bridge diode rectifier 33 connected across the leads 31 and establishing a pulsating direct current related to the current in the leads of rectifiers 27 and thus, in lead 3. The output of the rectifier 33 is filtered by a parallel capacitor 34 to form a filtered direct current signal which is impressed across a potentiometer 35 having a tap 36. The potentiometer 35 further defines a voltage divider for reducing or adjusting the feedback signal for differences in current transformer outputs such that proper maximum slope can be achieved without variations in current transformer constructions. The tap 36 of the transformer and the common end of the potentiometer 35 are connected across a further voltage dividing network consisting of a pair of series connected resistors 37. The common junction of the resistors 37 is connected to a line 38 which defines a common return or ground line for the control circuit. For purposes of simplicity of illustration, the several ground connections are shown by a conventional ground symbol. In an actual construction, the several grounded terminals are interconnected by suitable conductor or conductors.

A current pickoff circuit is connected in parallel with the voltage dividing resistors 37 and includes a first potentiometer 39 in series with a diode 40. The tap 41 of the potentiometer 39 thus provides a DC signal proportional to the current feedback signal at a current feedback line 42 connected to the amplifier 9.

The combination of the adjustable potentiometer 39 in parallel with the voltage dividing network 37 permits both negative and positive feedback with respect to the common ground line 38. This system is of particular significance in a welding power supply employing the series resistance 21 or any other similar load lead element which creates a natural slope in the output circuit and permits adjustment for optimum welding characteristics.

The illustrated current feedback amplifier 9 includes a full wave bridge rectifier 44 connected to one phase of the incoming power lines via a suitable transformer 45 to provide a DC bias supply. The output of the rectifier 44 is filtered by a suitable resistor-capacitor network 46 including a pair of series connected Zener diodes 47 connected directly across the filtered circuit. The junction of the Zener diodes 47 is grounded to define the common return line for the system. The networks 46 and Zener diodes 47 provide a regulated positive voltage, for example, 18 volts at the upper line 48, suitable for operating of the amplifier. The amplifier proper is a differential transistor amplifier including a pair of NPN transistors 49 and 50 parallel connected across the Zener diodes 47, in a well known differential amplifying circuit. A voltage dividing network including a potentiometer 51 in series with a dropping resistor 52 is connected across the Zener diodes 47. The slider or tap 53 of potentiometer 51 is connected in series with the resistor 54 to the base 55 of transistor 49 producing a bias circuit tending to turn on the transistor 49 and establish an output signal at its collector. The opposite or second transistor 50 of the differential amplifier is connected to be energized from a summing resistor or potentiometer 56, the one side of which is connected via resistor 57 to the current feedback line 43. The opposite side of the summing resistor 56 is connected via a lead 58 to a remote voltage receptacle 59. The internal receptacle connections are shown by dotted line connections within the receptacle 59. Thus, the lead 58 is connected to a lead 60 by the receptacle 59. The lead 60 is in turn connected to a potentiometer slider or tap 61 of an input voltage adjustment potentiometer 62 defining the input control 8 of FIG. 1. The potentiometer 62 has a one side connected in series with a diode 63 and a common dropping resistor 64 to the positive side or line 48 of the regulated voltage output of the rectifier 44. The opposite side of potentiometer 62 is connected through the receptacle 59 to the common ground via a lead 65.

Thus, in the operation of the system, the potentiometer 51 is set to establish a predetermined bias on the transistor 49. The potentiometer 62 is set to establish a predetermined voltage, related to a desired output voltage, to the one side of the summing resistor 56. The voltage on the other side is determined by the current feedback circuit and particularly the voltage of line 42. A potentiometer tap 65 of the potentiometer 56 connects the voltage through a limiting resistor 66 to the base of the transistor 50. Thus, the voltage applied to the transistor 50 is proportional to the summation of the reference or preset voltage established by potentiometer 62 less the voltage appearing at line 42. The output of the differential amplifier 9 which appears at a lead 67 connected to the collector of transistor 49 is therefore, directly proportional to the summation of the reference input voltage and the current feedback voltage.

The current feedback modified signal appearing at line 67 is applied to the voltage feedback network and particularly amplifier 12.

The voltage feedback system generally is similar to that of the current feedback system and includes the differential transistor amplifier including a pair of transistors connected to a regulated DC supply including a full wave bridge diode rectifier 68 connected across the output of transformer 45 and a regulating network 69. A voltage dividing potentiometer 70 is similarly connected to one transistor 71 of the differential amplifier and biases transistor 71 to conduct. The opposite transistor 72 of the differential amplifier is connected in a bias network to a summing resistor 73, the one side of which is connected to the current feedback line 67 and the opposite side of which is connected via a resistor 74 of the voltage feedback line 13. The output of the differential amplifier is taken off the collector of the transistor 71 via a line 75 which is connected in common to the input lines 29, 29 and 29'' for the several firing circuits 26.

The illustrated firing circuits employ a unijunction pulsing circuit 76 having a full wave bridge rectifier 77 connected to a corresponding phase through a phase winding 78 which is wound on a corresponding phase of the primary 17 of transformer 1 similar to the system shown in the Buchanan U.S. Pat. No. 3,337,769. The output of the rectifier 77 is not filtered and provides an in-phase charging current to the unijunction pulsing circuit 76 which includes a two stage amplifier including transistors 79 connected to control the charging of a firing capacitor 80 in the circuit of a unijunction transistor 81. The input transistor 79 is connected to line 27 via a series connected diode and resistor 82. The output of the unijunction circuit 76 in the illustrated embodiment of the invention however, controls the discharging of a capacitor 83 which is connected in series with a resistor 84 directly across the output of the rectifier 77. A silicon controlled rectifier 85 in series with a resistor 86 is connected across the capacitor 83. The output of the unijunction transistor 81 is connected via a signal line 87 to the gate of the controlled rectifier 85. Thus, between the firing periods of the unijunction transistor 81, the capacitor 83 is charged from the rectifier 77. The firing of unijunction transistor 81 fires the controlled rectifier 85 which conducts and discharges capacitor 83, thereby generating a corresponding voltage across the resistor 86. A pair of resistors 88 and 89 are connected in common at one end to the junction of the controlled rectifier 85 and the resistor 86 with the opposite ends connected respectively to the gates of the two controlled rectifiers 27 in the main rectifying unit 2. The cascaded power amplifying circuitry as shown is more fully disclosed in applicants' copending application entitled "Controlled Rectifier Arc Welding Supply Having Improved Positive Firing Characteristics" which was filed on the same day as the present application and is assigned to a common assignee.

Referring particularly to FIG. 2, the supply 26 is formed as a separate control circuit board 90 for controlling the direct current DC current supplied to the control or saturating windings 25. Generally, the illustrated embodiment of the invention includes a unijunction pulsed forming circuit 91 interconnected to a center tapped transformer-rectifier circuit 92. The saturating windings 25 are connected in series to the circuit 92. The magnitude of the average DC current flowing in the control windings 25 is determined by the phased firing of a pair of control rectifiers 93 and 94 of the circuit 92 during the relative positive half cycles applied to the respective controlled rectifiers. This in turn is directly controlled by the setting of the pulse forming circuit 91 to control the phase or time of the pulse.

More particularly, in the illustrated embodiment of the invention, the pulse forming circuit 91 includes a full wave diode bridge rectifier 95 connected to an input control transformer 45. A voltage regulating Zener diode 97 is connected across the output of the bridge rectifier 95 in series with a dropping resistor 98 to establish an essentially constant reference voltage to the pulse forming circuitry. If the line voltage should increase, Zener diode 97 will simply conduct a greater current and thereby maintain a constant voltage supplied to the load, in accordance with known theory of Zener diode regulation. The regulated output is applied to the interbase circuit of a unijunction transistor 99. In the illustrated embodiment of the invention, interbase resistors 100' and 101' are connected to the opposite sides of the unijunction transistor 99 and to the regulated voltage lines. A phase shift firing branch circuit 100 includes an adjustable potentiometer 101, a fixed resistor 102, and a capacitor 103 connected in series across the regulated voltage power supply and in parallel with the interbase elements of the unijunction transistor 99. The junction between the capacitor 103 and the fixed resistor 102 is connected to the emitter 104 of the unijunction transistor 99 to form a unijunction pulse forming network.

When the capacitor 103 charges to a selected level, the emitter 104 junction of the unijunction transistor 99 breaks down and conducts, discharging the capacitor 103 and biasing the transistor 99 to conduct. This results in a voltage signal appearing across the one base resistor 101' which as hereinafter described is applied to fire the controlled rectifiers 93 and 94 resulting in their conducting for a corresponding period of the related positive polarity half cycles. The time required to charge the capacitor 103 to the firing level is of course, determined by the time constant of the phase shift circuit and in particular, by the total resistance of the fixed resistor 102 and the potentiometer 101 in series with the capacitor 103. This unijunction transistor phase shift circuit is of a substantial advantage particularly where the potentiometer 101 is to be provided in a remote unit, because potentiometer 101 may be a small and low wattage unit and still produce the necessary variation in the DC supply to the control winding. For example, in a practical commercial construction, a two watt potentiometer 101 was employed to control the varying of the inductance range between 100 microhenries and 600 microhenries by controlling the time constant of the circuit and thereby the firing of the controlled rectifiers 93 and 94. This is quite important where the inductor control is to be incorporated in a separate, movable voltage and current control box where the conventional high voltage resistor may result in damaging temperature levels for circuit elements within the control box. Thus, the present invention has been found to provide a highly satisfactory control with the inductance potentiometer 101, as well as the current and voltage potentiometers and in a movable, remote control box 105 for example, as more fully shown in applicants' copending application entitled "Arc Welding Power Supply Assembly," which was filed on the same day as this application.

The center tapped transformer-rectifier unit 92 includes a reference transformer winding 106 coupled to one phase of the incoming three-phase power supply.

The first silicon controlled rectifier 93 is connected to the end of the winding 106 and to a reference or common conductor 107. The silicon controlled rectifier 93 is polarized to conduct from the winding 106 to the common reference line. A controlled rectifier will normally block conduction in both directions unless a turn-on current is applied to a gate element 108 during the period that the anode, shown connected to the winding 106, is positive relative to the cathode, shown connected to line 107. The conducting circuit for the controlled rectifier 93 is completed through the control windings 25 of the saturable inductor unit 20 back to a center tap 109 of the reference winding 106.

The second controlled rectifier 94 is similarly connected between the opposite end of the reference winding 106 and the common reference line 107 and is also polarized to conduct from the winding 106 to the common line 107. The circuit thus provides full wave rectification. When the left end of the reference winding 106 is positive, the corresponding controlled rectifier 93 conducts and supplies a current flow upwardly through the control windings 25. During this portion of the reference supply, the right end of the winding 106 is negative with respect to the center tap 109 and consequently, the second controlled rectifier 94 is back biased. the During the opposite half cycle of the power supply, the polarities of the opposite ends of the reference winding 106 reverse with respect to the center tap 109 and the second controlled rectifier 94 may now conduct and supply current upwardly through the control windings 25.

The controlled rectifiers 93 and 94 are controlled by connecting of the gates 108 in common to the signal line 110 from the unijunction transistor 99. A protective resistor 111 is connected in series to each of the respective gates.

In operation, the unijunction circuit establishes a train of time spaced pulse signals, with the phase or time directly controlled by the setting of the small, low wattage potentiometer 101. This, in turn, directly controls the period of the firing of the controlled rectifiers 93 and 94 and controls the corresponding conduction period. The average voltage and therefore, current which is supplied to the saturating windings 25 is correspondingly adjusted with the resulting control of the saturation of the core 24 and thereby the amount of inductance inserted by the load winding 19 in the negative output line 4.

Applicants have found that the new inductance control provided exceptionally satisfactory results, particularly for short arc-type welding and more particularly, in providing a very practical, reliable remote control system.

The operation of the illustrated embodiment of the invention shown in FIG. 2 may therefore, be briefly summarized as follows.

The main power supply connection is completed through any suitable means to energize the main transformer 1 and thereby establish the alternating current output of the secondary 16, the proportion of which is applied across the lines 3 and 4 in accordance with the firing of the controlled rectifier 27.

The reference input signal is established by proper positioning of the slider 61 on the reference potentiometer 62 with a consequent corresponding voltage applied to one side of the current summing resistor 56. The current feedback signal is established by the windings 30 of the current sensor, and modified by the slope adjustment potentiometer 41 to apply a corresponding modified current signal to the opposite side of resistor 56. The differential signal across resistor 56 provides a modulating input to transistor 50 of the current feedback differential amplifier 9 such that the output fed to the voltage feedback differential amplifier 12 reflects the desired slope characteristic superimposed upon the desired, otherwise constant, output voltage. The differential amplifier 12 similarly compares this signal with the voltage feedback signal at line 13 to apply a proper voltage signal to the firing circuit 28 to produce the necessary phased firing of the controlled rectifiers 27 for establishing and maintaining the desired constant output voltage with a selected slope. The series inductance winding 19 introduces a smoothing inductances into the circuit to eliminate the low current and voltage ripple which may interfere with the short arc and spray arc-type welding.

The saturable inductor unit 20 is selected to vary the inductance between relatively low and high values and generally between the range of 100 microhenries and 600 microhenries. Thus, applicants' have found that by employing the relatively large inductance in the order of 600 microhenries, a stable short or spray transfer arc is obtained without auxiliary sustaining diodes, not shown, or the like.

The special saturating control circuit, including the transistor oscillator circuit 91 having the small, low wattage potentiometer control and connected to drive the center-tapped transformer-rectifier circuit 92 for energizing of the saturating control winding 25 provides a linear and reliable adjustment over the desired or necessary range. The low wattage potentiometer permitted by this control particularly adapts the system to a remote control unit having other temperature sensitive elements associated therewith.

We claim:

1. In a welding system including a welding electrode means and a work member, a direct current arc power supply for establishing and maintaining an arc between the welding electrode means and the work member, the improvement in the direct current arc power supply comprising a transformer means to establish a welding voltage sufficient to establish and maintain an arc between said electrode means and said work member, a rectifier means connected to said transformer means to rectify said welding voltage, a pair of output means connected to said rectifier means and to said electrode means and said work member, said transformer means having a plurality of phase windings, said rectifier means having a plurality of triggered rectifiers connected to said phase windings and having gate means to control the conduction of said rectifiers and forming the sole arc power paths from said phase windings, means connected to the gate means to control the triggered rectifiers and thereby control the current supplied to the electrode means and work member, a saturable inductance control means having a controlled load smoothing winding means in series with said electrode means to insert a smoothing inductance in series with the electrode means and having a saturating control winding means to control the saturation of the inductance control means, said inductance control means being adjustable to include an inductance of the order of 100 to 600 microhenries, a direct current supply connected to said control winding means to supply saturating current to the control winding means, said direct current supply including a full wave transformer rectifier unit having a tapped transformer secondary having a center tap and a pair of triggered control rectifier means connected across the secondary with the control winding means connected between the center tap and the triggered control rectifier means to supply a full wave pulsating direct current to the control windings, a pulse forming circuit connected to the pair of triggered control rectifier means to selectively fire said triggered control rectifier means and supply a pulsating direct current to the control winding and including a low wattage potentiometer having a movable tap for controlling the phase of the pulse of the pulse forming circuit relative to the output of the secondary winding, and a cable means connecting said low wattage potentiometer in the pulse forming circuit to provide a remote control of the saturable inductance control, said low wattage potentiometer minimizing the generation of heat at the remote control.

2. The direct current arc power supply of claim 1 wherein said pulse forming circuit is a unijunction transistor oscillator including a unijunction transistor having an emitter to control conduction of said transistor and the formation of a pulse, said potentiometer being connected in series with a capacitor with a common connection of the capacitor and potentiometer connected to the emitter of said unijunction transistor.

3. The direct current arc power supply of claim 1, said pulse forming circuit includes a unijunction transistor oscillator having a regulated direct current input source and having a unijunction transistor connected across said source, said transistor having an emitter, an emitter circuit including a control capacitor in series with said low wattage potentiometer connected across said input source to charge said capacitor at a rate corresponding to the resistance of said potentiometer, said emitter being connected to the common connection between said capacitor and potentiometer for controlling the phase of the pulse output and said cable means connecting said low wattage potentiometer to said control capacitor and said input source and providing said remote control of the saturable inductance control means.